US012235667B2

(12) United States Patent
Ku

(10) Patent No.: US 12,235,667 B2
(45) Date of Patent: Feb. 25, 2025

(54) REGULATOR CIRCUIT MODULE, MEMORY STORAGE DEVICE AND VOLTAGE CONTROL METHOD

(71) Applicant: PHISON ELECTRONICS CORP., Miaoli (TW)

(72) Inventor: Po-Chih Ku, Changhua County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 231 days.

(21) Appl. No.: 18/079,900

(22) Filed: Dec. 13, 2022

(65) Prior Publication Data

US 2024/0126313 A1 Apr. 18, 2024

(30) Foreign Application Priority Data

Oct. 18, 2022 (TW) .................................. 111139459

(51) Int. Cl.
*G05F 1/575* (2006.01)

(52) U.S. Cl.
CPC .................................... *G05F 1/575* (2013.01)

(58) Field of Classification Search
CPC ........................................................ G05F 1/575
See application file for complete search history.

(56) References Cited

U.S. PATENT DOCUMENTS 11,314,267 B2 * 4/2022 Wang ...................... G05F 1/575
2003/0111986 A1 * 6/2003 Xi ........................... G05F 1/575 323/280
2006/0012356 A1 * 1/2006 Kase ........................ G05F 1/575 323/282
2006/0170401 A1 * 8/2006 Chen ........................ G05F 1/569 323/273
2007/0159146 A1 * 7/2007 Mandal ................... G05F 1/575 323/280
2017/0090494 A1 * 3/2017 Cui .......................... G05F 1/562
2022/0147080 A1 5/2022 Hsu et al.
2022/0147085 A1 * 5/2022 Hsu .......................... G05F 1/575
2022/0197321 A1 6/2022 Tiagaraj et al.

FOREIGN PATENT DOCUMENTS

CN 102868299 1/2013
TW 201619732 6/2016
TW 201734694 10/2017

OTHER PUBLICATIONS

"Office Action of Taiwan Counterpart Application", issued on Jul. 31, 2023, p. 1-p. 13.
"Office Action of China Counterpart Application", issued on Jun. 10, 2023, p. 1-p. 8.

* cited by examiner

*Primary Examiner* — Kyle J Moody
(74) *Attorney, Agent, or Firm* — JCIPRNET

(57) ABSTRACT

A regulator circuit module, a memory storage device, and a voltage control method are disclosed. The method includes: generating an output voltage according to an input voltage by a driving circuit; generating a feedback voltage according to the output voltage; controlling the driving circuit to adjust the output voltage according to the feedback voltage by a regulator circuit; compensating an output of the regulator circuit by a compensating circuit; and activating or deactivating the compensating circuit according to an input bypass-voltage of a switch circuit.

33 Claims, 7 Drawing Sheets

REGULATOR CIRCUIT MODULE, MEMORY STORAGE DEVICE AND VOLTAGE CONTROL METHOD

CROSS-REFERENCE TO RELATED APPLICATION

This application claims the priority benefit of Taiwan application serial no. 111139459, filed on Oct. 18, 2022. The entirety of the above-mentioned patent application is hereby incorporated by reference herein and made a part of this specification.

BACKGROUND OF THE INVENTION

Field of the Invention

The invention relates to a voltage control technique, and more particularly, to a regulator circuit module, a memory storage device, and a voltage control method.

Description of Related Art

As the size of memory control chips gets smaller, regulator circuit modules such as capacitor-less low-dropout (capless LDO) regulators are gradually applied to the packaging structures of memory control chips. Generally speaking, the electrical parameters used by various regulator circuit modules are preset before leaving the factory to meet most of the usage requirements. However, in practice, when the regulator circuit modules are operated under different load conditions, the performance of the regulator circuit modules to keep the output voltage stable may be reduced.

SUMMARY OF THE INVENTION

The invention provides a regulator circuit module, a memory storage device, and a voltage control method that may effectively improve the working performance of the regulator circuit module operated under different load conditions.

An exemplary embodiment of the invention provides a regulator circuit module including a driving circuit, a feedback circuit, a regulator circuit, a compensating circuit, and a switch circuit. The feedback circuit is coupled to the driving circuit. The regulator circuit is coupled to the driving circuit and the feedback circuit. The compensating circuit is coupled to the driving circuit and the regulator circuit. The switch circuit is coupled to the driving circuit, the regulator circuit, and the compensating circuit. The driving circuit is configured to generate an output voltage according to an input voltage. The feedback circuit is configured to generate a feedback voltage according to the output voltage. The regulator circuit is configured to control the driving circuit to adjust the output voltage according to the feedback voltage. The compensating circuit is configured to compensate an output of the regulator circuit. The switch circuit is configured to activate or deactivate the compensating circuit according to an input bypass-voltage of the switch circuit, and the input bypass-voltage of the switch circuit is affected by the output of the regulator circuit.

An exemplary embodiment of the invention further provides a memory storage device including a connection interface unit, a rewritable non-volatile memory module, a memory control circuit unit, and a regulator circuit module. The connection interface unit is configured to be coupled to a host system. The regulator circuit module is coupled to at least one of the connection interface unit, the rewritable non-volatile memory module, and the memory control circuit unit. The regulator circuit module is configured to: generate an output voltage according to an input voltage by a driving circuit; generate a feedback voltage according to the output voltage; control the driving circuit to adjust the output voltage according to the feedback voltage by a regulator circuit; compensate an output of the regulator circuit by a compensating circuit; and activate or deactivate the compensating circuit according to an input bypass-voltage of a switch circuit, and the input bypass-voltage of the switch circuit is affected by the output of the regulator circuit.

An exemplary embodiment of the invention further provides a voltage control method used in a memory storage device. The voltage control method includes: generating an output voltage according to an input voltage by a driving circuit; generating a feedback voltage according to the output voltage; controlling the driving circuit to adjust the output voltage according to the feedback voltage by a regulator circuit; compensating an output of the regulator circuit by a compensating circuit; and activating or deactivating the compensating circuit according to an input bypass-voltage of a switch circuit, and the input bypass-voltage of the switch circuit is affected by the output of the regulator circuit.

Based on the above, after the driving circuit generates the output voltage according to the input voltage, the feedback circuit may generate the feedback voltage according to the output voltage, and the regulator circuit may control the driving circuit to adjust the output voltage according to the feedback voltage. Furthermore, according to the output voltage, the compensating circuit configured to compensate the output of the regulator circuit may be activated or deactivated. Thereby, the working performance of the regulator circuit module operated under different load conditions may be effectively improved.

DESCRIPTION OF THE EMBODIMENTS

A plurality of exemplary embodiments are presented below to illustrate the invention, but the invention is not limited to the plurality of exemplary embodiments illustrated. Also, appropriate combinations are allowed between the exemplary embodiments. The term "coupled to" used in the entire text of the specification of the present application (including claims) may refer to any direct or indirect connecting means. For instance, if the text describes a first device is coupled to a second device, then it should be understood that the first device may be directly connected to the second device, or the first device may be indirectly connected to the second device via other devices or certain connecting means. In addition, the term "signal" may refer to at least one current, voltage, charge, temperature, data, or any other one or a plurality of signals.

Figure 1:
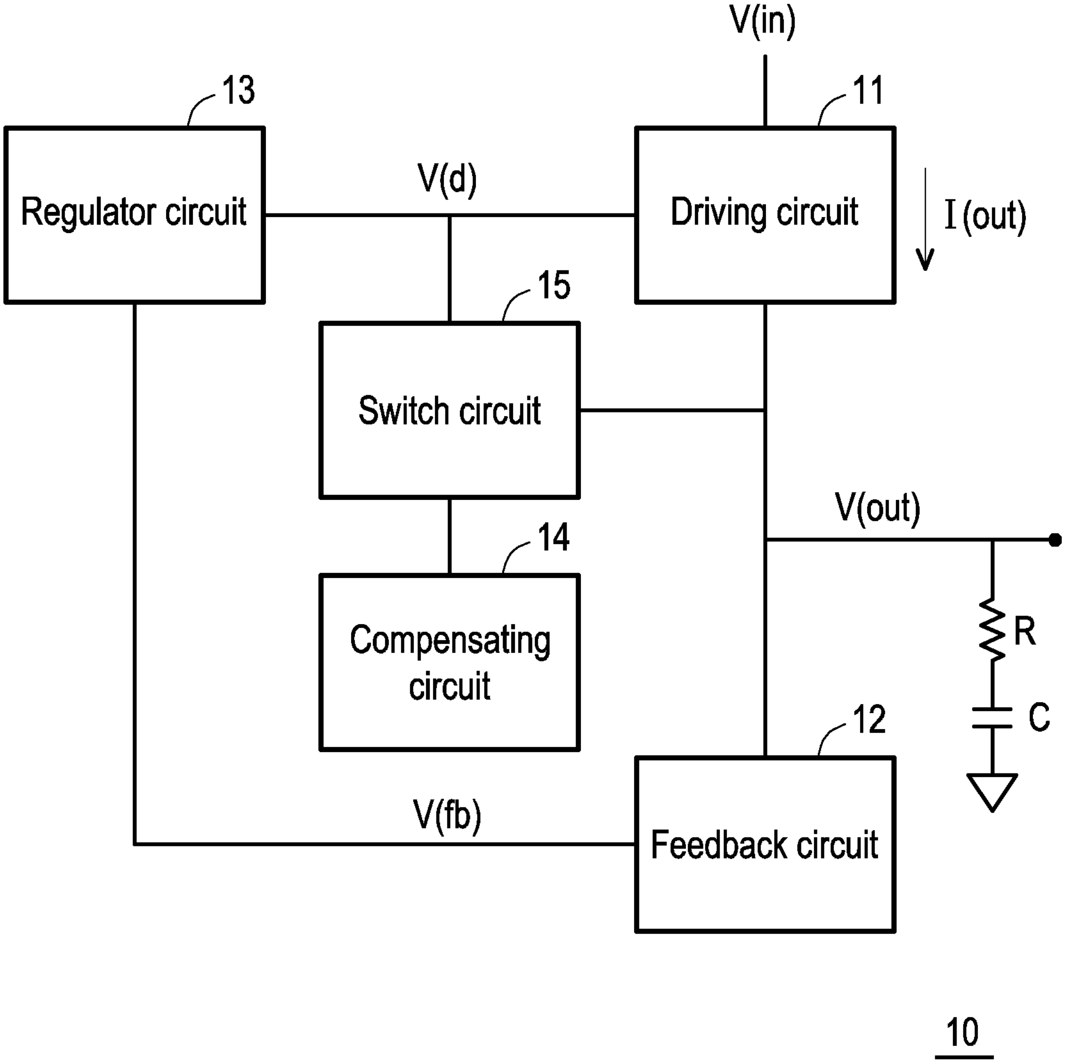
FIG. 1 is a schematic diagram of a regulator circuit module shown according to an exemplary embodiment of the invention.

FIG. 1 is a schematic diagram of a regulator circuit module shown according to an exemplary embodiment of the invention. Referring to FIG. 1, a regulator circuit module 10 may include a low dropout regulator (capless LDO) without output series resistance or a similar voltage control circuit module.

The regulator circuit module 10 includes a driving circuit 11, a feedback circuit 12, a regulator circuit 13, a compensating circuit 14, and a switch circuit 15. The driving circuit 11 may generate a voltage (also called an output voltage) V(out) according to a voltage (also called an input voltage) V(in). The voltage V(out) may be supplied to an external load. In addition, an impedance element R and a capacitive element C may be coupled to the output end of the driving circuit 11. In an exemplary embodiment, the capacitance of the capacitive element C (e.g., 100 picofarads (pF)) may be less than the capacitance of a larger-sized capacitive element C (e.g., 1 microfarad (μF)) used in conventional low dropout regulators. However, the invention does not limit the actual capacitance of the capacitive element C.

The feedback circuit 12 is coupled to the driving circuit 11. The feedback circuit 12 may generate a voltage (also referred to as a feedback voltage) V(fb) according to the voltage V(out). The voltage V(fb) may reflect the current state of the voltage V(out). For example, the voltage value of the voltage V(fb) may be positively related to the voltage value of the voltage V(out). In addition, the voltage V(fb) may also reflect the change of a current I(out). The current I(out) is also supplied to the external load.

The regulator circuit 13 is coupled to the driving circuit 11 and the feedback circuit 12. The regulator circuit 13 may receive the voltage V(fb). In particular, the regulator circuit 13 may control the driving circuit 11 to adjust the voltage V(out) according to the voltage V(fb). For example, the regulator circuit 13 may monitor the change of the voltage V(out) according to the voltage V(fb) and attempt to overcome the change to restore the voltage V(out) to a stable state. For example, in response to a drop in the voltage value of the voltage V(out), the regulator circuit 13 may control the driving circuit 11 to adjust the voltage V(out), so that the voltage V(out) returns to a stable state (e.g., the voltage value of the voltage V(out) is pulled up to a predetermined value). Or, in response to an increase in the voltage value of the voltage V(out), the regulator circuit 13 may also control the driving circuit 11 to adjust the voltage V(out), so that the voltage V(out) returns to a stable state (e.g., the voltage value of the voltage V(out) is dropped to a predetermined value).

In an exemplary embodiment, the regulator circuit 13 may generate a voltage (also referred to as a control voltage) V(d) according to the voltage V(fb). For example, the voltage V(d) may be generated at the output end of the regulator circuit 13. The voltage V(d) may affect the driving voltage of the driving circuit 11. For example, the voltage V(d) may be positively related to the driving voltage of the driving circuit 11. Therefore, by adjusting the voltage V(d), the voltage V(out) output by the driving circuit 11 may be adjusted synchronously.

The compensating circuit 14 may be coupled to the regulator circuit 13 via the switch circuit 15. The compensating circuit 14 may be configured to compensate the output of the regulator circuit 13. For example, the compensating circuit 14 may be coupled to the output end of the regulator circuit 13 via the switch circuit 15 and perform high frequency compensation on the output of the regulator circuit 13.

The switch circuit 15 is coupled to the driving circuit 11, the regulator circuit 13, and the compensating circuit 14. The switch circuit 15 may receive the voltages V(d) and V(out) synchronously. The switch circuit 15 may activate or deactivate the compensating circuit 14 according to the input bypass-voltage of the switch circuit 15. In particular, this input bypass-voltage may be affected by the voltages V(d) and V(out). For example, the input bypass-voltage of switch circuit 15 may be equal to or positively related to the voltage difference between the voltages V(d) and V(out). That is, the larger the voltage difference between the voltages V(d) and V(out), the larger the input bypass-voltage of the switch circuit 15 is. In an exemplary embodiment, the switch circuit 15 may conduct the compensating circuit 14 to the output end of the regulator circuit 13 according to the input bypass-voltage, so as to activate the compensating circuit 14. Or, in an exemplary embodiment, the switch circuit 15 may also disconnect the compensating circuit 14 from the output end of the regulator circuit 13 according to the input bypass-voltage, so as to deactivate the compensating circuit 14.

In an exemplary embodiment, the regulator circuit module 10 may be operated in one of a heavy-load mode and a light-load mode. In the heavy-load mode, the switch circuit 15 may activate the compensating circuit 14. For example, in the heavy-load mode, the switch circuit 15 may conduct the compensating circuit 14 to the output end of the regulator circuit 13. In response to the compensating circuit 14 being conducted to the output end of the regulator circuit 13 (i.e., the compensating circuit 14 being activated), the compensating circuit 14 may perform high frequency compensation on the output of the regulator circuit 13. Moreover, in the light-load mode, the switch circuit 15 may disconnect the compensating circuit 14 from the output end of the regulator circuit 13. In response to the compensating circuit 14 being disconnected from the output end of the regulator circuit 13 (i.e., the compensating circuit 14 being deactivated), the compensating circuit 14 stops compensating the output of the regulator circuit 13.

In an exemplary embodiment, when the external load is relatively larger (i.e., the current value of the current I(out) is increased), the regulator circuit module 10 is currently operated in the heavy-load mode. In contrast, when the external load is relatively smaller (i.e., the current value of the current I(out) is decreased), the regulator circuit module 10 is currently operated in the light-load mode. In an exemplary embodiment, the compensating circuit 14 performs high frequency compensation on the output of the regulator circuit 13 in the heavy load mode, so as to optimize the high frequency response of the regulator circuit 13. However, in the light-load mode, the compensating circuit 14 compensates the output of the regulator circuit 13, which may make the high frequency response of the regulator circuit 13 worse. Therefore, in an exemplary embodiment, by dynamically activating or deactivating the compensating circuit 14, the high frequency response of the regulator circuit 13 may be effectively optimized (or at least maintained) regardless of whether the current regulator circuit module 10 is operated in the heavy-load mode or the light-load mode.

In an exemplary embodiment, the voltage V(fb) may feed back the load condition of the external load to the regulator circuit 13, thereby affecting the input bypass-voltage of the switch circuit 15. In an exemplary embodiment, the switch circuit 15 may activate or deactivate the compensating circuit 14 according to whether the input bypass-voltage meets a critical condition. For example, the switch circuit 15 may activate the compensating circuit 14 in response to the input bypass-voltage meeting the critical condition. Additionally, the switch circuit 15 may deactivate the compensating circuit 14 in response to the input bypass-voltage not meeting the critical condition.

In an exemplary embodiment, in the heavy-load mode, the current value of the current I(out) is increased. At this time, according to the change of the voltage V(fb), the input bypass-voltage of the switch circuit 15 meets the critical condition (i.e., the voltage difference between the voltages V(d) and V(out) is greater than the critical value). The switch circuit 15 may activate the compensating circuit 14 in response to the input bypass-voltage meeting the critical condition. Conversely, in the light-load mode, the current value of the current I(out) is decreased. At this time, according to the change of the voltage V(fb), the input bypass-voltage of the switch circuit 15 does not meet the critical condition (i.e., the voltage difference between the voltages V(d) and V(out) is not greater than the critical value). The switch circuit 15 may deactivate the compensating circuit 14 in response to the input bypass-voltage not meeting the critical condition.

From another point of view, in the heavy-load mode, in response to the voltage difference between the voltages V(d) and V(out) being greater than the critical value, the compensating circuit 14 is coupled to the signal transmission path between the driving circuit 11 and the regulator circuit 13. Therefore, in the heavy-load mode, the driving voltage of the driving circuit 11 may be controlled by the regulator circuit 13 and the compensating circuit 14 at the same time. However, in the light-load mode, in response to the voltage difference between the voltages V(d) and V(out) not being greater than the critical value, the compensating circuit 14 is disconnected from the signal transmission path between the driving circuit 11 and the regulator circuit 13. Therefore, in the light-load mode, the driving voltage of the driving circuit 11 may be controlled by the regulator circuit 13 but not controlled by the compensating circuit 14.

Figure 2:
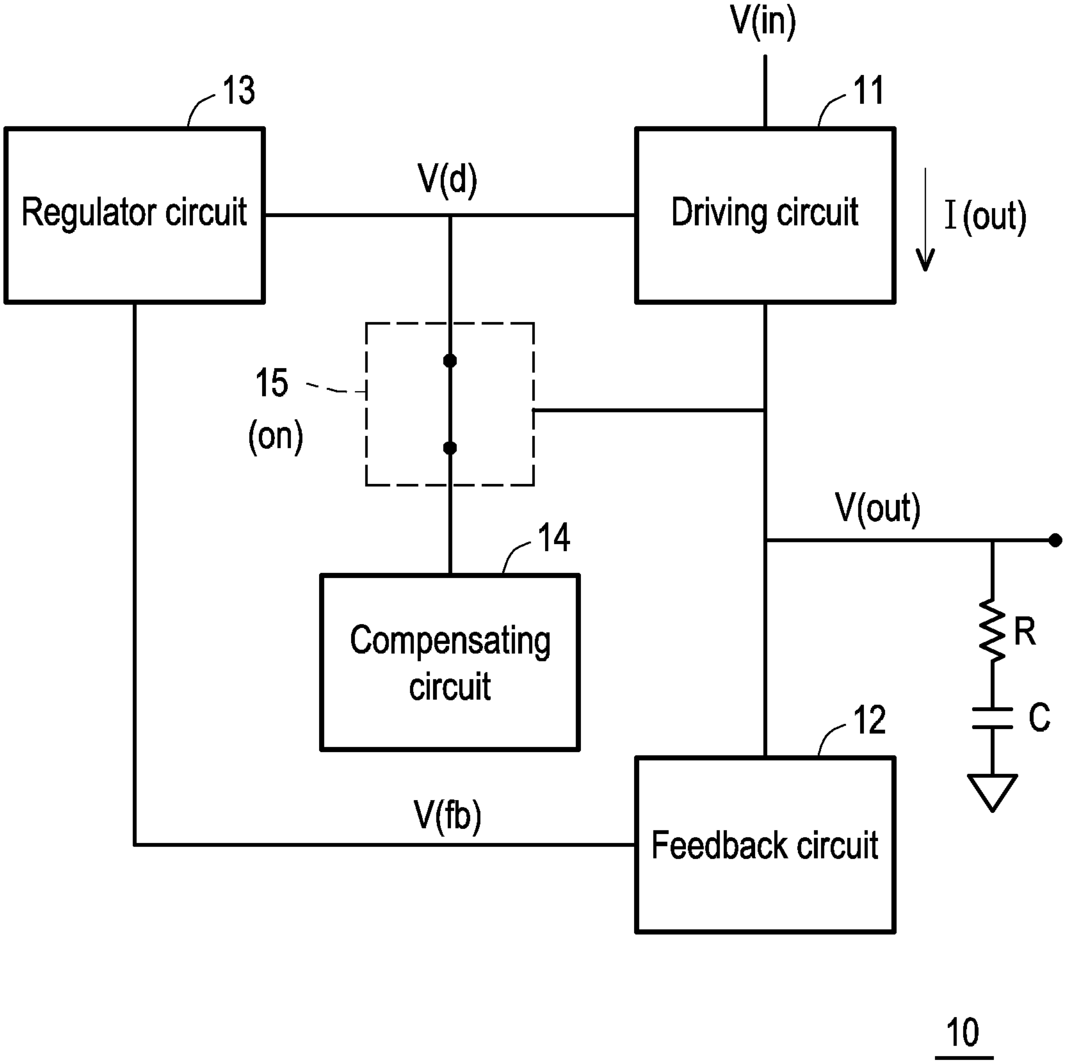
FIG. 2 is a schematic diagram of activating a compensating circuit in a regulator circuit module shown according to an exemplary embodiment of the invention.

FIG. 2 is a schematic diagram of activating a compensating circuit in a regulator circuit module shown according to an exemplary embodiment of the invention.

Referring to FIG. 2, in the heavy-load mode, the switch circuit 15 may conduct the compensating circuit 14 to the output end of the regulator circuit 13. Thereby, the compensating circuit 14 may compensate the high frequency response of the regulator circuit 13. The compensated voltage V(d) may be sent to the driving circuit 11 to control the driving circuit 11 to adjust (or maintain) the output voltage V(out).

Figure 3:
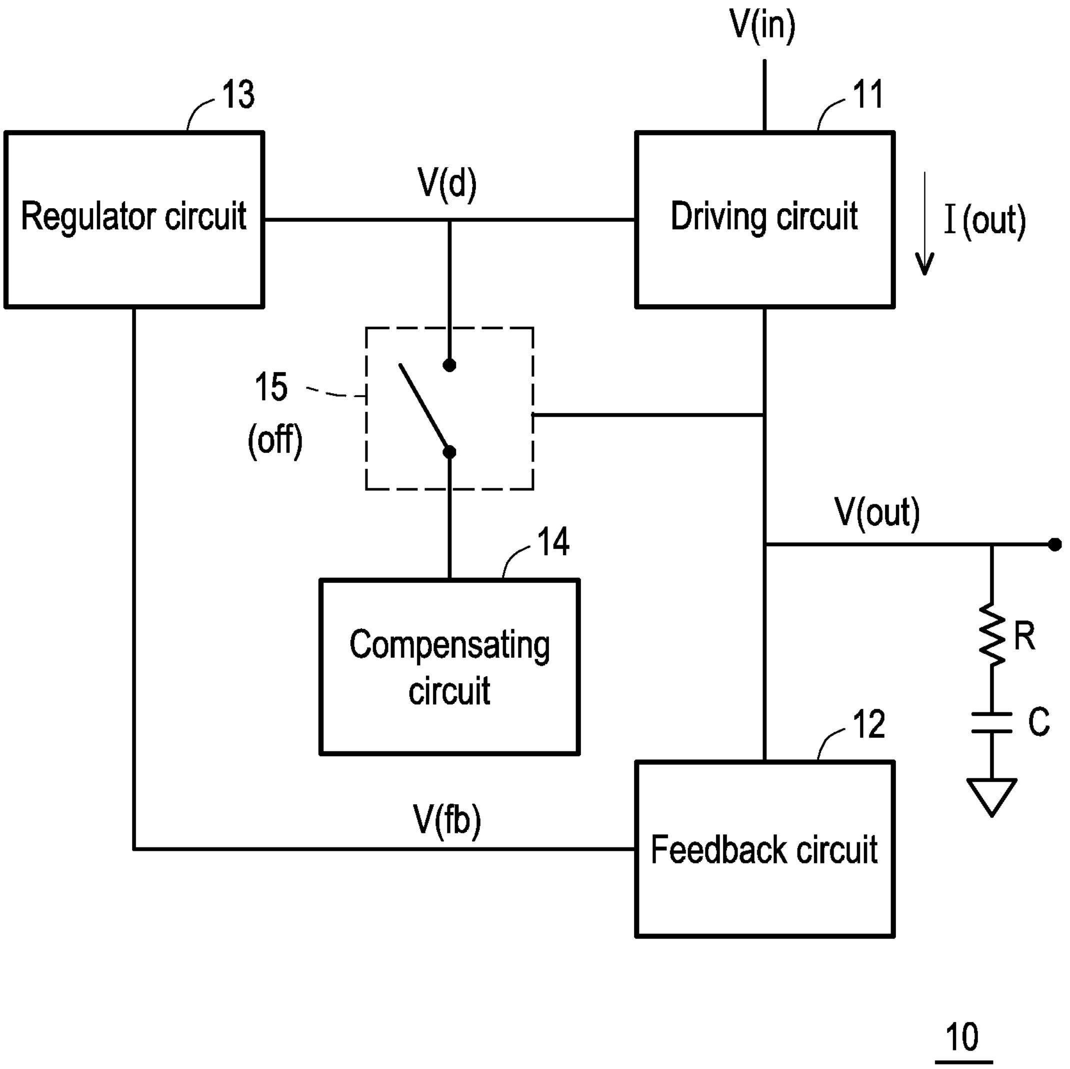
FIG. 3 is a schematic diagram of deactivating a compensating circuit in a regulator circuit module shown according to an exemplary embodiment of the invention.

FIG. 3 is a schematic diagram of deactivating a compensating circuit in a regulator circuit module shown according to an exemplary embodiment of the invention.

Referring to FIG. 3, in the light-load mode, the switch circuit 15 may disconnect the compensating circuit 14 from the output end of the regulator circuit 13. After the compensating circuit 14 is disconnected, the compensating circuit 14 may not compensate the output (i.e., the voltage V(d)) of the regulator circuit 13. At this time, the voltage V(d) not compensated by the compensating circuit 14 may be transmitted to the driving circuit 11 to control the driving circuit 11 to adjust (or maintain) the output voltage V(out).

Figure 4:
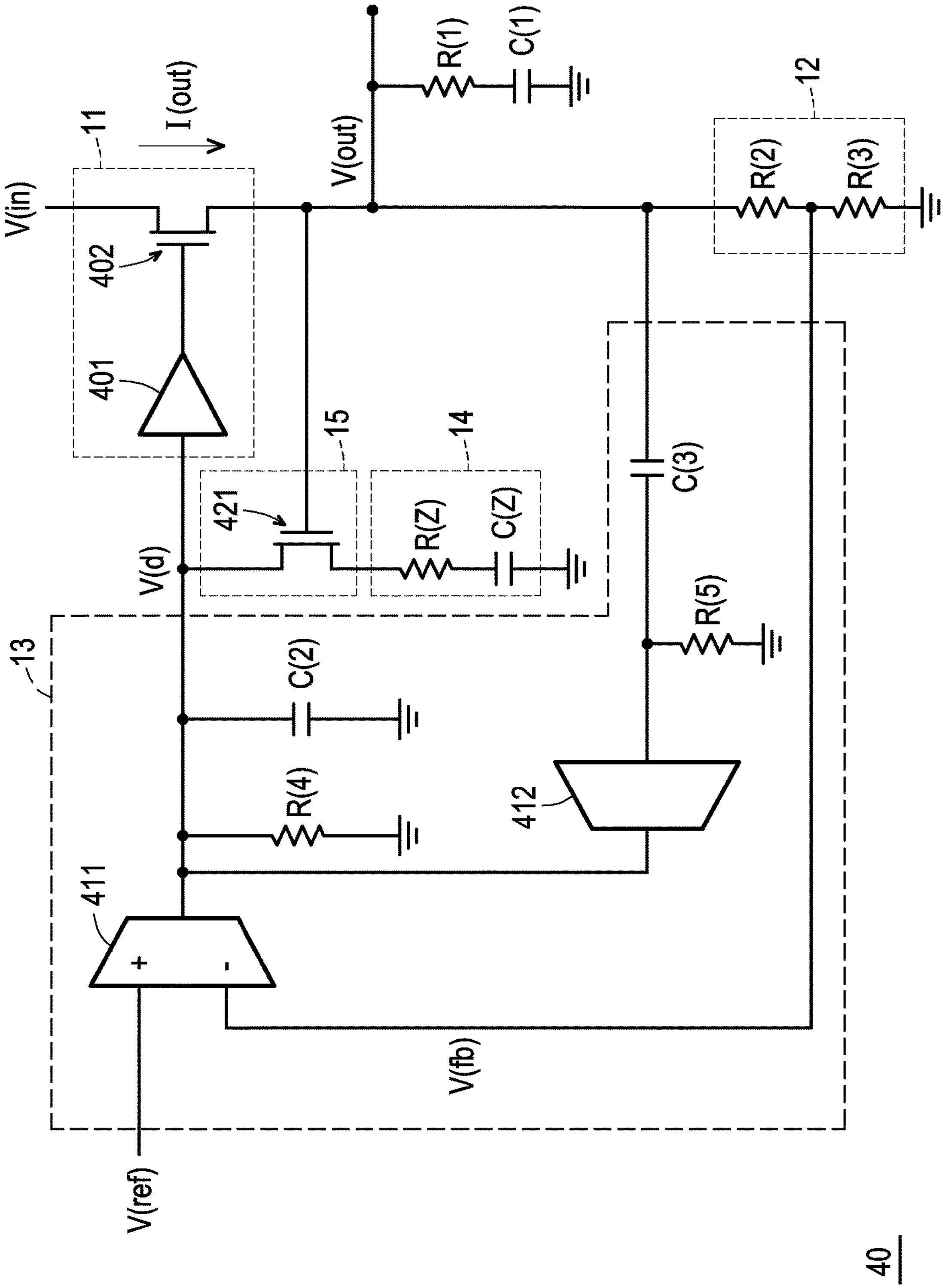
FIG. 4 is a schematic diagram of a regulator circuit module shown according to an exemplary embodiment of the invention.

FIG. 4 is a schematic diagram of a regulator circuit module shown according to an exemplary embodiment of the invention.

Referring to FIG. 4, a regulator circuit module 40 may include the regulator circuit module 10 of FIG. 1. The driving circuit 11 may include a signal amplifier 401 and a transistor element 402. The transistor element 402 may include an N-type metal-oxide-semiconductor field-effect transistor (N-type MOSFET) or other types of transistors. A drain (D) of the transistor element 402 may be coupled to the voltage V(in). A source (S) of the transistor element 402 may be coupled to the voltage V(out). The signal amplifier 401 may be coupled to a gate (G) of the transistor element 402. Therefore, the voltage V(d) may be amplified by the signal amplifier 401 and then sent to the gate (G) of the transistor element 402. The transistor element 402 may be controlled by the voltage (i.e., the driving voltage) of the gate (G) to generate the voltage V(out) according to the voltage V(in). In particular, the voltage (i.e., the driving voltage) of the gate (G) may be used to control or adjust the voltage value of the voltage V(out). In addition, an impedance element R(1) and a capacitive element C(1) may be coupled to the output end of the driving circuit 11. For example, the impedance element R(1) and the capacitive element C(1) may respectively include the impedance element R and the capacitive element C of FIG. 1, which are repeated herein. It should be noted that, in general, one or a plurality of series resistors may be connected in series between the output end of the driving circuit 11 and the external load. However, as shown in FIG. 4, the output end of the driving circuit 11 is not coupled to any series resistance. Thereby, the versatility of the regulator circuit module 40 may be increased.

The feedback circuit 12 may include impedance elements R(2) and R(3). The impedance elements R(2) and R(3) may be connected in series with each other to form a voltage divider circuit. The voltage divider circuit may generate the voltage V(fb) according to the voltage V(out). The voltage value of the voltage V(fb) may be positively related to the voltage value of the voltage V(out). At the same time, the voltage V(fb) may reflect the change of the current I(out) and/or the current load condition of the regulator circuit module 40.

The regulator circuit 13 may include an error amplifier 411, a signal amplifier 412, an impedance element R(4), an impedance element R(5), a capacitive element C(2), and a capacitive element C(3). The error amplifier 411 may receive the voltage V(fb) and a voltage (also referred to as the reference voltage) V(ref). The error amplifier 411 may compare the voltages V(ref) and V(fb) and generate the voltage V(d) according to the comparison result, and then adjust the voltage V(out) via the voltage V(d). The signal amplifier 412, the impedance element R(5), and the capacitive element C(3) may be coupled between the output end of the error amplifier 411 and the output end of the driving circuit 11 (or between the voltages V(out) and V(d)), in order to form another signal feedback channel between the driving circuit 11 and the regulator circuit 13. The signal feedback channel may be configured to compensate the low frequency response of the regulator circuit 13. In addition, the impedance element R(4) and the capacitive element C(2) are coupled to the output end (or the voltage V(d)) of the error amplifier 411.

The compensating circuit 14 includes an impedance element R(Z) and a capacitive element C(Z). The impedance element R(Z) and the capacitive element C(Z) are connected in series to form a frequency compensating circuit. For example, the impedance element R(Z) may be connected in series between the switch circuit 15 and the capacitive element C(Z). In this way, the compensating circuit 14 may be configured to perform high frequency compensation on the output of the error amplifier 411 (i.e., the voltage V(d)).

The switch circuit 15 includes a transistor element 421. The transistor element 421 may include a P-type MOSFET or other types of transistors. A source (S) (also referred to as the first end) of the transistor element 421 may be coupled to the output end (or the voltage V(d)) of the error amplifier 411. A drain (D) (also referred to as the second end) of the transistor element 421 may be coupled to the compensating circuit 14 (or the impedance element R(Z)). A gate (G) (also referred to as the third end) of the transistor element 421 may be coupled to the output end (or the voltage V(out)) of the driving circuit 11. Thereby, the transistor element 421 may activate or deactivate the compensating circuit 14 according to the voltage difference between the voltages V(d) and V(out).

In an exemplary embodiment, the transistor element 421 may activate or deactivate the compensating circuit 14 according to whether the voltage difference between the first end (i.e., the source (S)) and the third end (i.e., the gate (G)) reaches a critical value. For example, in the heavy-load mode, in response to the voltage difference between the first end and the third end reaching (e.g., greater than) the critical value, the transistor element 421 may conduct the compensating circuit 14 to the output end of the regulator circuit 13 (or the error amplifier 411) to compensate the voltage V(d). Or, in the light-load mode, in response to the voltage difference between the first end and the third end not reaching (e.g., not greater than) the critical value, the transistor element 421 may disconnect the compensating circuit 14 from the output end of the regulator circuit 13 (or the error amplifier 411), in order to prevent the work efficiency of the regulator circuit 13 from being lowered due to the influence of the compensating circuit 14.

Figure 5:
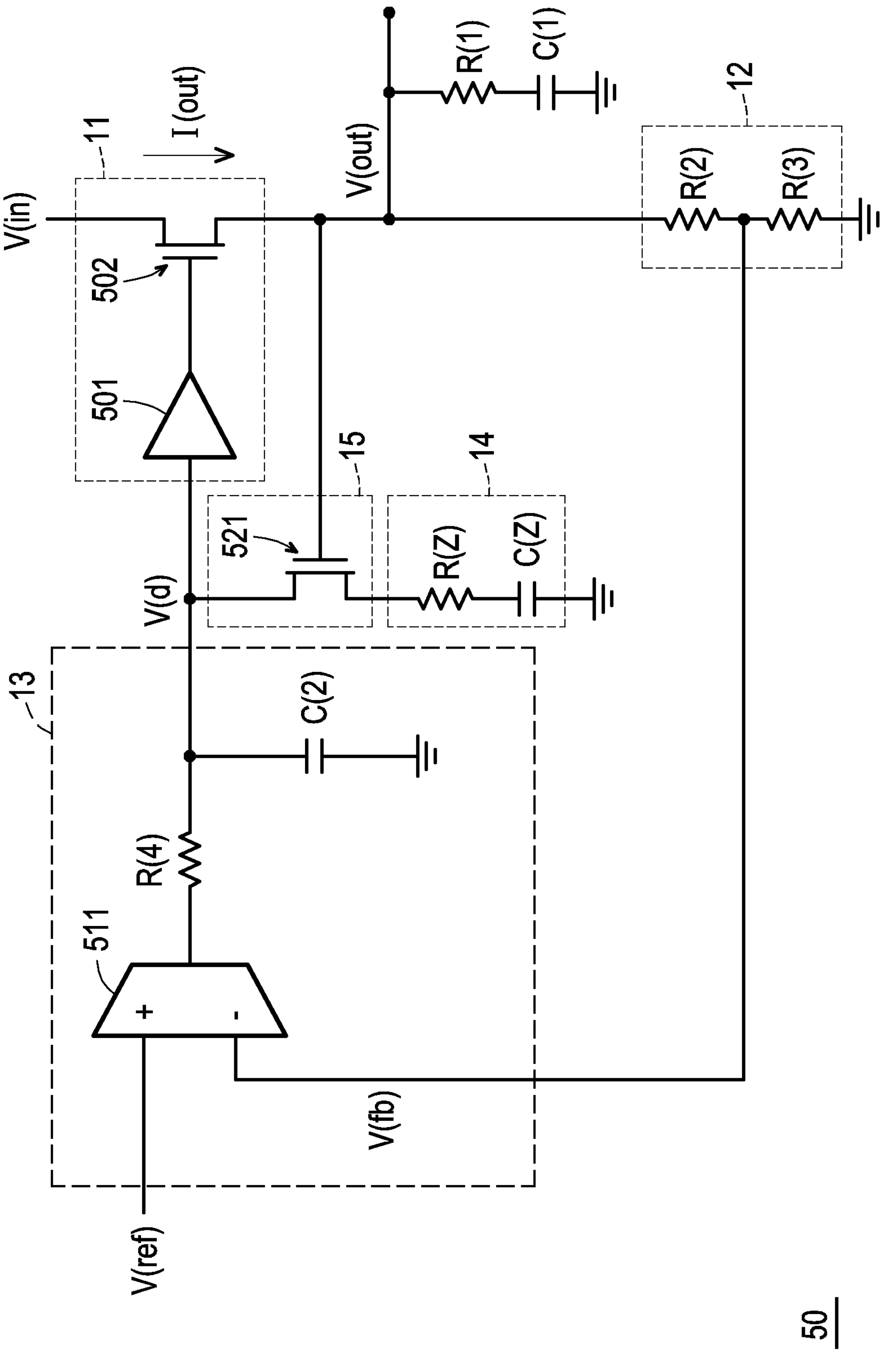
FIG. 5 is a schematic diagram of a regulator circuit module shown according to an exemplary embodiment of the invention.

FIG. 5 is a schematic diagram of a regulator circuit module shown according to an exemplary embodiment of the invention.

Referring to FIG. 5, a regulator circuit module 50 may include the regulator circuit module 10 of FIG. 1. The driving circuit 11 may include a signal amplifier 501 and a transistor element 502. The signal amplifier 501 and the transistor element 502 may be the same as or similar to the signal amplifier 401 and the transistor element 402 of FIG. 4. The voltage V(d) may be amplified by the signal amplifier 501 and then sent to a gate (G) of the transistor element 502. The transistor element 502 may be controlled by the voltage (i.e., the driving voltage) of the gate (G) to generate the voltage V(out) according to the voltage V(in). The impedance element R(1) and the capacitive element C(1) may be coupled to the output end of the driving circuit 11. In addition, the feedback circuit 12 may include the impedance elements R(2) and R(3) to generate the voltage V(fb) according to the voltage V(out). It should be noted that, similar to the exemplary embodiment of FIG. 4, in the exemplary embodiment of FIG. 5, the output end of the driving circuit 11 is also not coupled to any series resistor. Thereby, the versatility of the regulator circuit module 50 may be increased.

The regulator circuit 13 may include an error amplifier 511, the impedance element R(4), and the capacitive element C(2). The error amplifier 511 may compare the voltages V(ref) and V(fb) and generate the voltage V(d) according to the comparison result, and then adjust the voltage V(out) via the voltage V(d). The impedance element R(4) may be connected in series between the output end of the error amplifier 511 and the driving circuit 11. The capacitive element C(2) may be coupled between the impedance element R(4) and the driving circuit 11. In addition, the compensating circuit 14 may include the impedance element R(Z) and the capacitive element C(Z) to form a frequency compensating circuit.

The switch circuit 15 includes a transistor element 521. Transistor element 521 may be the same as or similar to the transistor element 421 of FIG. 4. That is, the transistor element 521 may activate or deactivate the compensating circuit 14 according to the voltage difference between the voltages V(d) and V(out). For example, in the heavy-load mode, in response to the voltage difference between the voltages V(d) and V(out) reaching (e.g., greater than) a critical value, the transistor element 521 may conduct the compensating circuit 14 to the output end of the regulator circuit 13 (or the error amplifier 511) to compensate the voltage V(d). Moreover, in the light-load mode, in response to the voltage difference between the voltages V(d) and V(out) not reaching (e.g., not greater than) the critical value, the transistor element 521 may disconnect the compensating circuit 14 from the output end of the regulator circuit 13 (or the error amplifier 511), in order to prevent the work efficiency of the regulator circuit 13 from being lowered due to the influence of the compensating circuit 14.

It should be noted that, in the exemplary embodiments of FIG. 1 to FIG. 4, the coupling relationship between each electronic circuit (or electronic element) may be adjusted according to practical requirements, which is not limited in the invention. Or, more useful electronic circuits (or electronic elements) may also be appropriately added to the regulator circuit module 10, 40, or 50 or configured to replace specific electronic circuits (or electronic elements) in the regulator circuit module 10, 40, or 50, which is not limited in the invention.

In an exemplary embodiment, the regulator circuit module 10 of FIG. 1, the regulator circuit module 40 of FIG. 4 or the regulator circuit module 50 of FIG. 5 may be disposed in a memory storage device. Or, in an exemplary embodiment, the regulator circuit module 10 of FIG. 1, the regulator circuit module 40 of FIG. 4 or the regulator circuit module 50 of FIG. 5 may also be disposed in other types of electronic devices.

Figure 6:
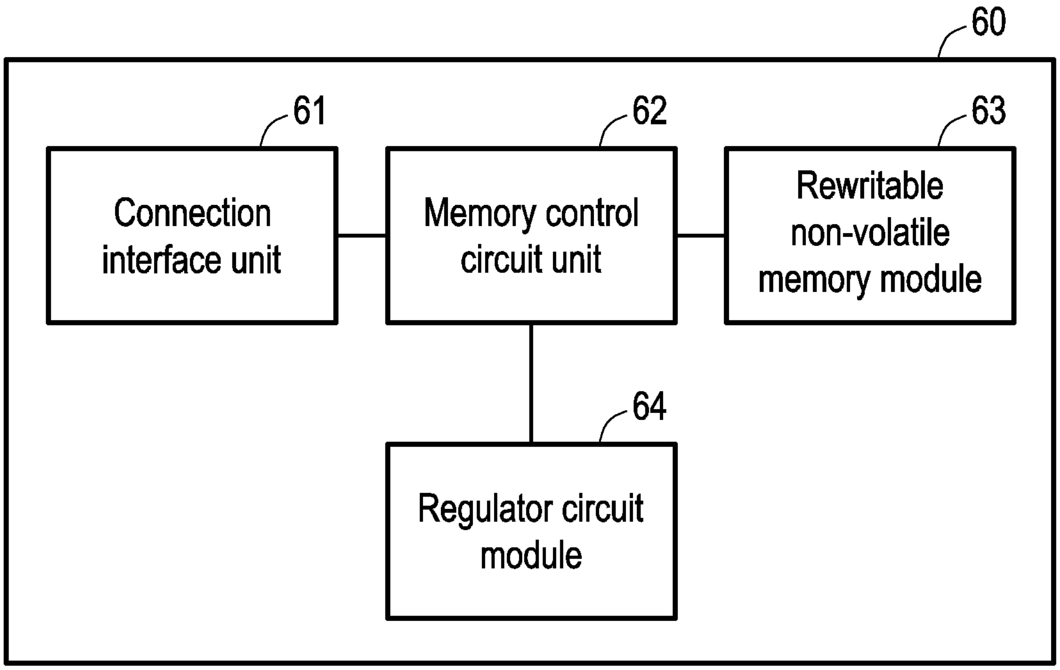
FIG. 6 is a schematic diagram of a memory storage device shown according to an exemplary embodiment of the invention.

FIG. 6 is a schematic diagram of a memory storage device shown according to an exemplary embodiment of the invention.

Referring to FIG. 6, a memory storage device 60 includes a connection interface unit 61, a memory control circuit unit 62, a rewritable non-volatile memory module 63, and a regulator circuit module 64.

The connection interface unit 61 is configured to couple the memory storage device 60 to a host system. The memory storage device 60 may be communicated with the host system via the connection interface unit 61. In an exemplary embodiment, the connection interface unit 61 is compatible with the Peripheral Component Interconnect Express (PCI Express) standard. In an exemplary embodiment, the connection interface unit 61 may also be compatible with the Serial Advanced Technology Attachment (SATA) standard, Parallel Advanced Technology Attachment (PATA) standard, Institute of Electrical and Electronic Engineers (Institute of Electrical and Electronic Engineers, IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 61 may be sealed in a chip with the memory control circuit unit 62. Alternatively, the connection interface unit 61 is disposed outside of a chip containing the memory control circuit unit 62.

The memory control circuit unit 62 is coupled to the connection interface unit 61 and the rewritable non-volatile memory module 63. The memory control circuit unit 62 is configured to execute a plurality of logic gates or control commands implemented in a hardware form or in a firmware form and perform operations such as writing, reading, and erasing data in the rewritable non-volatile memory storage module 63 according to the commands of the host system.

The rewritable non-volatile memory module 63 is configured to store the data written by the host system. The rewritable non-volatile memory module 63 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 63 stores one or a plurality of bits via the change in voltage (also referred to as critical voltage hereinafter). Specifically, a charge-trapping layer is disposed between the control gate and the channel of each of the memory cells. By applying a write voltage to the control gate, the number of electrons of the charge-trapping layer may be changed, and therefore the critical voltage of the memory cells may be changed. This operation of changing the critical voltage of the memory cells is also referred to as "writing data to the memory cells" or "programming the memory cells". As the critical voltage is changed, each of the memory cells in the rewritable non-volatile memory module 63 has a plurality of storage states. Which storage state one memory cell belongs to may be determined via the application of a read voltage, so as to obtain one or a plurality of bits stored by the memory cell.

In an exemplary embodiment, the memory cells of the rewritable non-volatile memory module 63 may form a plurality of physical programming units, and these physical programming units may form a plurality of physical erasing units. Specifically, the memory cells on the same word line may form one or a plurality of physical programming units. If one memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundancy bit area. The data bit area contains a plurality of physical pages configured to store user data, and the redundancy bit area is configured to store system data (for example, management data such as an ECC). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erase units contains the smallest number of memory cells erased together. For example, the physical erasing unit is a physical block.

The regulator circuit module 64 may include the regulator circuit module 10 of FIG. 1, the regulator circuit module 40 of FIG. 4, or the regulator circuit module 50 of FIG. 5. The regulator circuit module 64 may be disposed inside the memory storage device 60 and coupled to at least one of the connection interface unit 61, the memory control circuit unit 62, and the rewritable non-volatile memory module 63 to perform the associated regulation operation. Alternatively, the regulator circuit module 64 may also be disposed inside at least one of the connection interface unit 61, the memory control circuit unit 62, and the rewritable non-volatile memory module 63. For details of the implementation of the regulator circuit module 64, please refer to the exemplary embodiments of FIG. 1 to FIG. 5, and details are not repeated herein.

Figure 7:
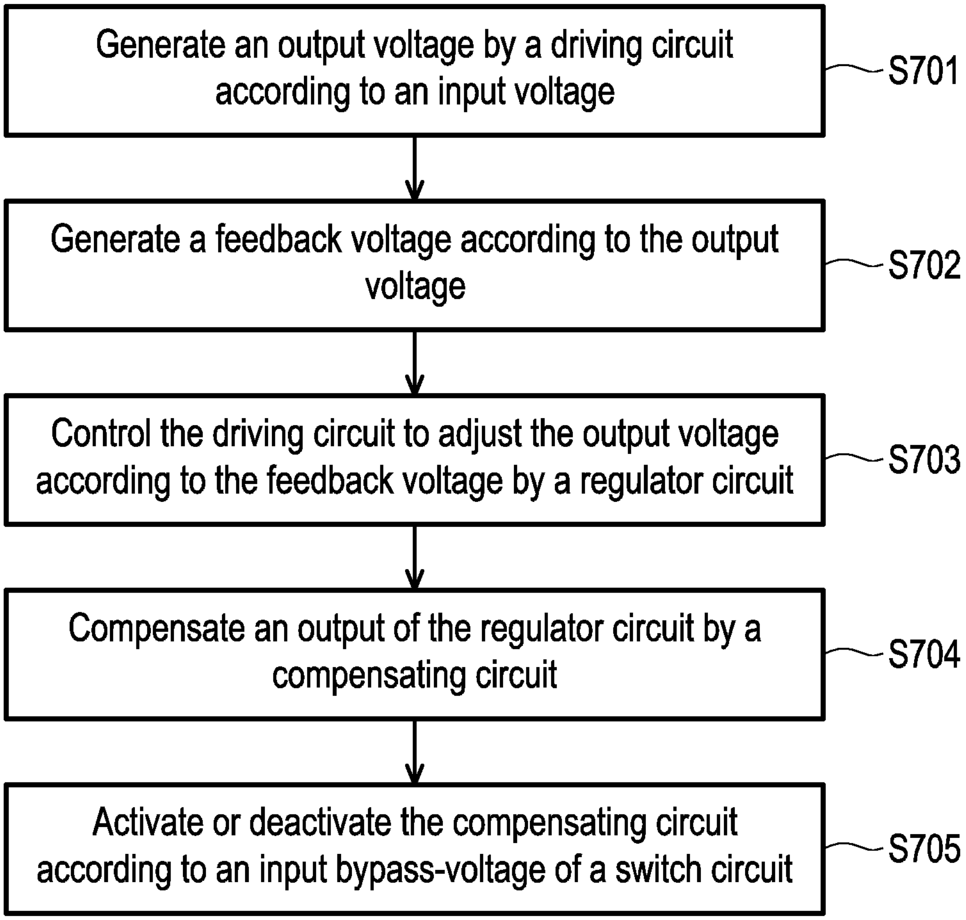
FIG. 7 is a flowchart of a voltage control method shown according to an exemplary embodiment of the invention.

FIG. 7 is a flowchart of a voltage control method shown according to an exemplary embodiment of the invention.

Referring to FIG. 7, in step S701, an output voltage is generated according to an input voltage by a driving circuit. In step S702, a feedback voltage is generated according to the output voltage. In step S703, a regulator circuit controls the driving circuit to adjust the output voltage according to the feedback voltage. In step S704, an output of the regulator circuit is compensated by a compensating circuit. In step S705, the compensating circuit is activated or deactivated according to an input bypass-voltage of a switch circuit. In particular, the input bypass-voltage of the switch circuit is affected by the output of the regulator circuit.

However, each step in FIG. 7 is as described in detail above, and is not repeated herein. It should be mentioned that, each step in FIG. 7 may be implemented as a plurality of program codes or circuits, and the present application is not limited thereto. Moreover, the method of FIG. 7 may be used with the above exemplary embodiments, and may also be used alone, and the present application is not limited thereto.

Based on the above, the regulator circuit module, the memory storage device, and the voltage control method provided by the embodiments of the invention can, during the period when the driving circuit generates the output voltage according to the input voltage, dynamically activate or deactivate the compensating circuit configured to compensate the output of the regulator circuit according to the current load condition (e.g., heavy load or light load). Thereby, the working performance of the regulator circuit module operated under different load conditions may be effectively improved.

Although the disclosure has been disclosed by the above embodiments, they are not intended to limit the disclosure. It is apparent to one of ordinary skill in the art that modifications and variations to the disclosure may be made without departing from the spirit and scope of the disclosure. Accordingly, the protection scope of the disclosure will be defined by the appended claims.

What is claimed is:

1. A regulator circuit module, comprising:
- a driving circuit;
- a feedback circuit coupled to the driving circuit;
- a regulator circuit coupled to the driving circuit and the feedback circuit;
- a compensating circuit; and
- a switch circuit coupled to the driving circuit, the regulator circuit, and the compensating circuit,
- wherein the driving circuit is configured to generate an output voltage according to an input voltage,
- the feedback circuit is configured to generate a feedback voltage according to the output voltage,
- the regulator circuit is configured to control the driving circuit to adjust the output voltage according to the feedback voltage,
- the compensating circuit is configured to compensate an output of the regulator circuit, and
- the switch circuit is configured to activate or deactivate the compensating circuit according to an input bypass-voltage of the switch circuit, and the input bypass-voltage of the switch circuit is affected by the output of the regulator circuit.

2. The regulator circuit module of claim 1, wherein the switch circuit activating or deactivating the compensating circuit according to the input bypass-voltage of the switch circuit comprises:
- activating the compensating circuit in a heavy-load mode; and
- deactivating the compensating circuit in a light-load mode.

3. The regulator circuit module of claim 1, wherein the switch circuit activating or deactivating the compensating circuit according to the input bypass-voltage of the switch circuit comprises:
- activating the compensating circuit in response to the input bypass-voltage of the switch circuit meeting a critical condition; and
- deactivating the compensating circuit in response to the input bypass-voltage of the switch circuit not meeting the critical condition.

4. The regulator circuit module of claim 1, wherein the switch circuit activating or deactivating the compensating circuit according to the input bypass-voltage of the switch circuit comprises:
- conducting the compensating circuit to an output end of the regulator circuit in a heavy-load mode; and
- disconnecting the compensating circuit from the output end of the regulator circuit in a light-load mode.

5. The regulator circuit module of claim 1, wherein in a heavy-load mode, a driving voltage of the driving circuit is simultaneously controlled by the regulator circuit and the compensating circuit, and
- in a light-load mode, the driving voltage of the driving circuit is controlled by the regulator circuit and not controlled by the compensating circuit.

6. The regulator circuit module of claim 1, wherein the switch circuit comprises a transistor element, a first end of the transistor element is coupled to an output end of the regulator circuit, a second end of the transistor element is coupled to the compensating circuit, and a third end of the transistor element is coupled to the output voltage.

7. The regulator circuit module of claim 6, wherein the switch circuit activating or deactivating the compensating circuit according to the input bypass-voltage of the switch circuit comprises:
- activating or deactivating the compensating circuit according to whether a voltage difference between the first end and the third end reaches a critical value.

8. The regulator circuit module of claim 6, wherein the transistor element comprises a P-type MOSFET.

9. The regulator circuit module of claim 1, wherein the regulator circuit comprises an error amplifier, and
- the error amplifier is configured to compare a reference voltage with the feedback voltage and adjust the output voltage according to a comparison result.

10. The regulator circuit module of claim 9, wherein the compensating circuit is configured to compensate a high frequency response of the regulator circuit,
- the regulator circuit further comprises a signal amplifier, wherein the signal amplifier is coupled between an output end of the driving circuit and an output end of the error amplifier, and
- the signal amplifier is configured to compensate a low frequency response of the regulator circuit.

11. The regulator circuit module of claim 1, wherein the compensating circuit comprises an impedance element and a capacitive element, and the impedance element is connected in series between the switch circuit and the capacitive element.

12. A memory storage device, comprising:
- a connection interface unit configured to be coupled to a host system;
- a rewritable non-volatile memory module;
- a memory control circuit unit; and
- a regulator circuit module coupled to at least one of the connection interface unit, the rewritable non-volatile memory module, and the memory control circuit unit,
- wherein the regulator circuit module is configured to:
  - generate an output voltage according to an input voltage by a driving circuit;
  - generate a feedback voltage according to the output voltage;
  - control the driving circuit to adjust the output voltage according to the feedback voltage by a regulator circuit;
  - compensate an output of the regulator circuit by a compensating circuit; and
  - activate or deactivate the compensating circuit according to an input bypass-voltage of a switch circuit, and the input bypass-voltage of the switch circuit is affected by the output of the regulator circuit.

13. The memory storage device of claim 12, wherein the activating or deactivating the compensating circuit according to the input bypass-voltage of the switch circuit comprises:
- activating the compensating circuit in a heavy-load mode; and
- deactivating the compensating circuit in a light-load mode.

14. The memory storage device of claim 12, wherein the activating or deactivating the compensating circuit according to the input bypass-voltage of the switch circuit comprises:

activating the compensating circuit in response to the input bypass-voltage of the switch circuit meeting a critical condition; and deactivating the compensating circuit in response to the input bypass-voltage of the switch circuit not meeting the critical condition.

15. The memory storage device of claim 12, wherein the activating or deactivating the compensating circuit according to the input bypass-voltage of the switch circuit comprises:

conducting the compensating circuit to an output end of the regulator circuit in a heavy-load mode; and disconnecting the compensating circuit from the output end of the regulator circuit in a light-load mode.

16. The memory storage device of claim 12, wherein in a heavy-load mode, a driving voltage of the driving circuit is simultaneously controlled by the regulator circuit and the compensating circuit, and in a light-load mode, the driving voltage of the driving circuit is controlled by the regulator circuit and not controlled by the compensating circuit.

17. The memory storage device of claim 12, wherein the regulator circuit module comprises the switch circuit, and the switch circuit is configured to activate or deactivate the compensating circuit according to the input bypass-voltage of the switch circuit, the switch circuit comprises a transistor element, wherein a first end of the transistor element is coupled to an output end of the regulator circuit, a second end of the transistor element is coupled to the compensating circuit, and a third end of the transistor element is coupled to the output voltage.

18. The memory storage device of claim 17, wherein the activating or deactivating the compensating circuit according to the input bypass-voltage of the switch circuit comprises:

activating or deactivating the compensating circuit according to whether a voltage difference between the first end and the third end reaches a critical value by the transistor element.

19. The memory storage device of claim 17, wherein the transistor element comprises a P-type MOSFET.

20. The memory storage device of claim 12, wherein the regulator circuit comprises an error amplifier, and the error amplifier is configured to compare a reference voltage with the feedback voltage and adjust the output voltage according to a comparison result.

21. The memory storage device of claim 12, wherein the compensating circuit is configured to compensate a high frequency response of the regulator circuit, the regulator circuit further comprises a signal amplifier, wherein the signal amplifier is coupled between an output end of the driving circuit and an output end of the error amplifier, and the signal amplifier is configured to compensate a low frequency response of the regulator circuit.

22. The memory storage device of claim 12, wherein the compensating circuit comprises an impedance element and a capacitive element, and the impedance element is connected in series between the switch circuit and the capacitive element.

23. A voltage control method, configured for a memory storage device, the voltage control method comprising:

generating an output voltage according to an input voltage by a driving circuit;

generating a feedback voltage according to the output voltage;

controlling the driving circuit to adjust the output voltage according to the feedback voltage by a regulator circuit;

compensating an output of the regulator circuit by a compensating circuit; and activating or deactivating the compensating circuit according to an input bypass-voltage of a switch circuit, and the input bypass-voltage of the switch circuit is affected by the output of the regulator circuit.

24. The voltage control method of claim 23, wherein the activating or deactivating the compensating circuit according to the input bypass-voltage of the switch circuit comprises:

activating the compensating circuit in a heavy-load mode; and deactivating the compensating circuit in a light-load mode.

25. The voltage control method of claim 23, wherein the activating or deactivating the compensating circuit according to the input bypass-voltage of the switch circuit comprises:

activating the compensating circuit in response to the input bypass-voltage of the switch circuit meeting a critical condition; and deactivating the compensating circuit in response to the input bypass-voltage of the switch circuit not meeting the critical condition.

26. The voltage control method of claim 23, wherein the activating or deactivating the compensating circuit according to the output voltage comprises:

conducting the compensating circuit to an output end of the regulator circuit in a heavy-load mode; and disconnecting the compensating circuit from the output end of the regulator circuit in a light-load mode.

27. The voltage control method of claim 23, wherein in a heavy-load mode, a driving voltage of the driving circuit is simultaneously controlled by the regulator circuit and the compensating circuit, and in a light-load mode, the driving voltage of the driving circuit is controlled by the regulator circuit and not controlled by the compensating circuit.

28. The voltage control method of claim 23, wherein the memory storage device comprises the switch circuit, and the switch circuit is configured to activate or deactivate the compensating circuit according to the input bypass-voltage of the switch circuit, the switch circuit comprises a transistor element, wherein a first end of the transistor element is coupled to an output end of the regulator circuit, a second end of the transistor element is coupled to the compensating circuit, and a third end of the transistor element is coupled to the output voltage.

29. The voltage control method of claim 28, wherein the activating or deactivating the compensating circuit according to the input bypass-voltage of the switch circuit comprises:

activating or deactivating the compensating circuit according to whether a voltage difference between the first end and the third end reaches a critical value by the transistor element.

30. The voltage control method of claim 28, wherein the transistor element comprises a P-type MOSFET.

31. The voltage control method of claim 23, wherein the controlling the driving circuit to adjust the output voltage according to the feedback voltage by the regulator circuit comprises:

comparing a reference voltage with the feedback voltage and adjusting the output voltage according to a comparison result.

32. The voltage control method of claim 23, wherein the compensating circuit is configured to compensate a high frequency response of the regulator circuit, and the voltage control method further comprises:

compensating a low frequency response of the regulator circuit by a signal amplifier, wherein the signal amplifier is coupled between an output end of the driving circuit and an output end of the regulator circuit.

33. The voltage control method of claim 23, wherein the compensating circuit comprises an impedance element and a capacitive element, and the impedance element is connected in series between the switch circuit and the capacitive element.

* * * * *